United States Patent
Jayaram et al.

(10) Patent No.: US 7,258,446 B2
(45) Date of Patent: Aug. 21, 2007

(54) SYSTEM AND METHOD FOR INTELLIGENT INFORMATION HANDLING SYSTEM PROJECTOR COOL DOWN

(75) Inventors: Subramanian Jayaram, Austin, TX (US); Vinay Subramanian, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 360 days.

(21) Appl. No.: 11/044,115

(22) Filed: Jan. 27, 2005

(65) Prior Publication Data

US 2006/0164602 A1    Jul. 27, 2006

(51) Int. Cl.
G03B 21/16    (2006.01)
G03B 21/18    (2006.01)

(52) U.S. Cl. ............................ 353/52; 353/57; 348/748
(58) Field of Classification Search ................. 353/52, 353/57–58; 348/748
See application file for complete search history.

(56) References Cited

U.S. PATENT DOCUMENTS

| | | | | |
|---|---|---|---|---|
| 5,136,397 A * | 8/1992 | Miyashita | ................... | 348/748 |
| 5,285,363 A | 2/1994 | Meuse | ........................ | 362/293 |
| 5,813,233 A | 9/1998 | Okuda et al. | ................ | 62/3.7 |
| 6,322,218 B1 * | 11/2001 | Sugawara et al. | ............. | 353/52 |
| 6,588,907 B1 * | 7/2003 | Billington et al. | ............. | 353/57 |
| 2002/0163626 A1 | 11/2002 | Takizawa et al. | .............. | 353/52 |
| 2005/0034468 A1 * | 2/2005 | Dietz et al. | ..................... | 62/236 |

FOREIGN PATENT DOCUMENTS

| | | |
|---|---|---|
| EP | 1503239 A1 | 2/2005 |
| EP | 1562139 A1 | 8/2005 |
| EP | 1650967 A1 | 4/2006 |
| JP | 04053943 A | 2/1992 |
| JP | 08069054 | 3/1996 |
| JP | 2005-070514 | 3/2005 |
| WO | WO 2004/097774 A1 | 11/2004 |
| WO | WO 2004/097774 A2 | 11/2004 |

* cited by examiner

*Primary Examiner*—Christopher Mahoney
(74) *Attorney, Agent, or Firm*—Hamilton & Terrile, LLP; Robert W. Holland

(57) ABSTRACT

An information handling system projector cooling fan runs for a variably defined time after its lamp is turned off in order to adequately cool the projector without running the cooling fan for an excessive cool down period. In one embodiment, the cooling fan runs after lamp shut down until one or more thermocouples detects a predetermined temperature associated with the projector. In an alternative embodiment, fan cool down time varies based on the length of time the lamp was on before shutdown. The cool down thermal gradient is selectable between a convenience mode, in which an increased cooling gradient allows quicker cooling fan shut down, and a long-life mode, in which a decreased cooling gradient preserves lamp life.

11 Claims, 4 Drawing Sheets

SYSTEM AND METHOD FOR INTELLIGENT INFORMATION HANDLING SYSTEM PROJECTOR COOL DOWN

BACKGROUND OF THE INVENTION

1. Field of the Invention

The present invention relates in general to the field of information handling system projectors, and more particularly to a system and method for intelligent information handling system projector cool down.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often interact with a number of peripherals to communicate, print, display or otherwise process information. For instance, information handling systems often display information by using projectors. Projectors generate images with a LCD panel, illuminate the image with a bright lamp, and present the image through a lens focused against a distal screen. Projectors aid in the presentation of information from an information handling system to a group of individuals and, thus, have become a popular way to present information in business meetings. Typically, a presenter prepares information on a portable information handling system using applications such as POWERPOINT by MICROSOFT and carries the information handling system and projector to the meeting. At the meeting, the presenter connects the information handling system to the projector and illuminates images provided from the information handling system with the projector for other attendees of the meeting to see. After the presentation, the projector and information handling system are generally powered down and then taken by the presenter when the meeting is complete. In today's fast paced business environment, presenters often make repeated presentations in various locations during the course of a day so that a typical projector may be powered up and shut down repeatedly during the course of a day.

One difficulty associated with the use of projectors to display information is that the lamps used to illuminate the information produce substantial amounts of heat during illumination. In order to ensure proper operation of the electronic components within the projector as well as the lamp, projectors are typically equipped with cooling fans that transport heat from the projector during operation. However, when the lamp is not illuminated, the cooling fans typically turn off after a defined time period in order to reduce the noise produced incidental to the operation of the cooling fans. Generally, projector cooling fans are designed to remain on for the defined period after the illumination from the lamp is ended so that the lamp and projector components receiving cooling air to reduce their temperature. However, users sometimes interrupt post-operation cooling by unplugging the projector before the defined period is complete. For instance, users are often in a rush after completing a presentation and do not want to wait for the predefined period to end. Also, running the cooling fans after completion of a presentation often annoys users who prefer to have a post-presentation discussion in quiet without the cooling fan noise in the background. Unplugging the projector to shut down cooling fan operation before the lamp and projector components have cooled typically reduces the life of the lamp and components, often leading to premature failure.

SUMMARY OF THE INVENTION

Therefore a need has arisen for a system and method which reduces projector cool down time after lamp shut down.

In accordance with the present invention, a system and method are provided which substantially reduce the disadvantages and problems associated with previous methods and systems for projector cool down after lamp shut down. A projector cooling fan runs for variably defined cool down periods after the projector lamp shuts down, the variably defined cool down period achieving desired projector cooling without excessive cooling fan operation.

More specifically, a projector cooling manager interfaces with a projector lamp and a projector cooling fan and detects the lamp as in an on or off state. When lamp transitions from the on to the off state, the cooling manager determines a variably defined cool down time and runs the cooling fan until the variably defined cool down time expires. The variably defined cool down time ensures adequate cooling for the lamp and the projector image processing components while running the cooling fan little if at all after the adequate cooling is complete. In one embodiment, the variably defined cool down time is determined based upon the length of time that the lamp was in the on state, with greater lamp operating times having greater cool down times. In another embodiment, thermocouples measure the projector temperature and provide the measured temperature to the cooling manager, which runs the cooling fan until the measured temperature is a predetermined temperature. The cooling manager cools the projector by running the fan in a convenience mode at a maximal cooling gradient that cools the projector in minimal time to achieve quicker cooling fan shutdown. Alternatively, the cooling manager cools the projector by running the fan in a long-life mode at a reduced cooling gradient that cools the projector more gradually to aid in maintaining a longer lamp life.

The present invention provides a number of important technical advantages. One example of an important technical advantage is that projector cool down time after lamp shut down is reduced to a period of time appropriate for the heat built up in the projector. Shorter projector run times that build up less heat have a shorter cool down times, thus reducing the inconvenience to users who would otherwise have to wait longer periods of time for the cooling fan to stop after lamp shut down. The time for fan operation after lamp shut down is variably defined by measured temperature within the projector or by expected temperatures predicted based on projector run time so that adequate cooling is assured after lamp shutdown to preserve lamp and projector component useful lifespan. The convenience cool down mode ensures adequate cooling in minimal time for quick projector shut down. Alternatively, the long-life cool down mode reduces the stress put on the lamp by rapid thermal gradients and reduces projector operating cost with less frequent replacement of expensive projector bulbs.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Variably defined cool down periods for information handling system projectors reduce the time a cooling fan runs after lamp shutdown for a selected cool down mode. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
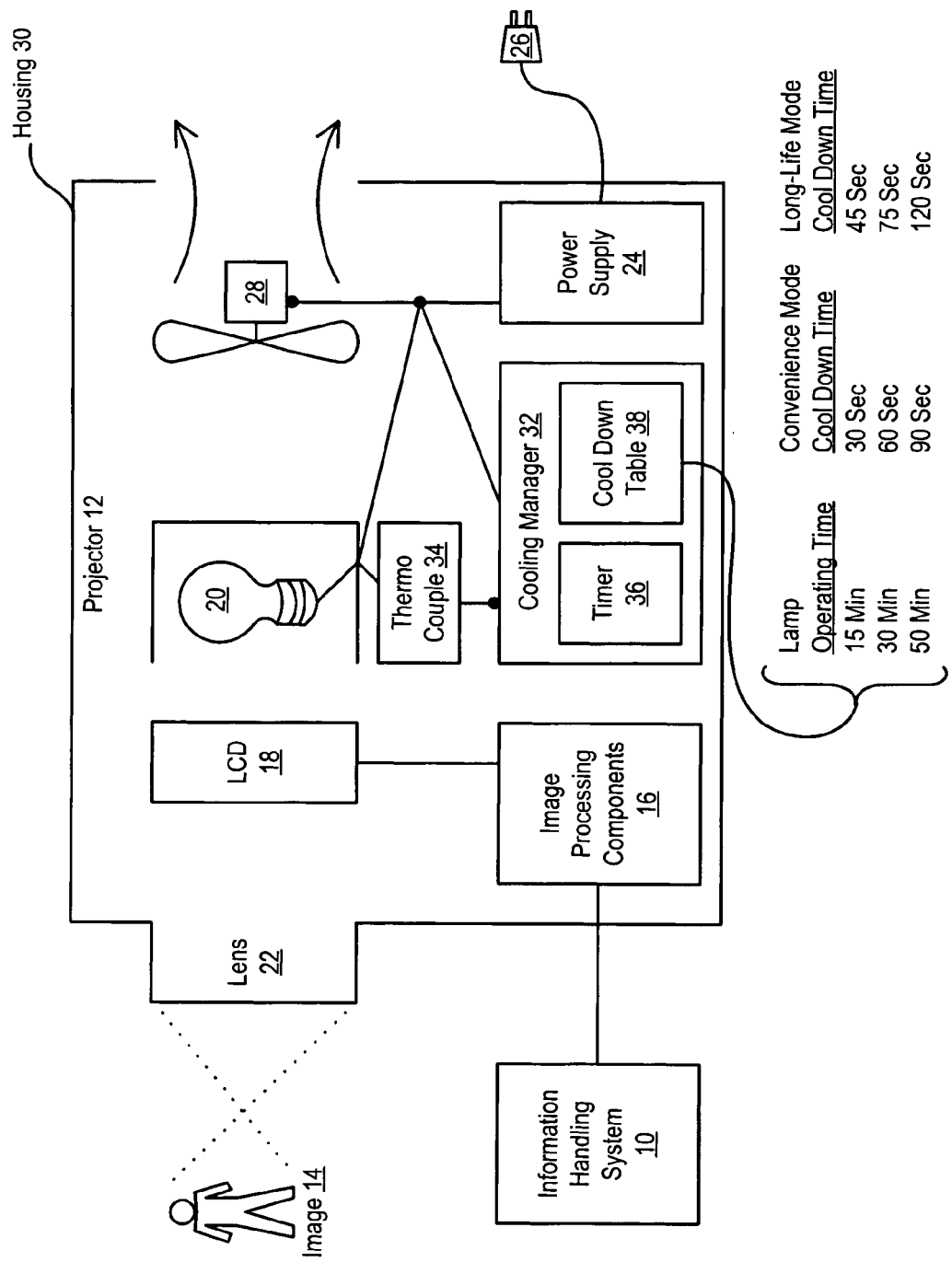
FIG. 1 depicts an information handling system projector having variably defined cool down periods after lamp shut down.

Referring now to FIG. 1, a functional block diagram depicts an information handling system projector having variably defined cool down periods after lamp shut down. An information handling system 10 generates information, such as graphical images 14, for display by a projector 12. Image processing components 16 accept the information from information handling system 10 to formulate the image at an LCD 18. A lamp 20, such as a halogen light, illuminates LCD 18 aligned with lens 22 to project the image 14 distal to projector 12. Power to generate and illuminate image 14 comes from a power supply 24 that connects at an external power source 26, such as an AC socket. During operation of projector 12, a cooling fan 28 runs to provide cooling airflow through the housing 30 that contains the projector components. The primary source of heat within housing 30 is lamp 20.

A cooling manager 32 interfaces with lamp 20 and cooling fan 28 to manage operation of cooling fan 28 after shutdown of lamp 20 so that projector 12 receives cooling from fan 28 for a variably defined cool down period. In one embodiment, cooling manager 32 interfaces with one or more thermocouples 34 that determine the temperature of projector 12. When cooling manager 32 detects a transition of lamp 20 from an on state to an off state, cooling manager 32 monitors the temperature of projector 12 and runs cooling fan 28 until the temperature drops to a predetermined level, such as a level that allows safe packaging of projector 12. By using the measured temperature of projector 12, cooling manager 32 ensures that cooling fan 28 operates long enough to achieve a cooled down state without additional unnecessary operation of cooling fan 28. In an alternative embodiment, cooling manager 32 has a timer 36 and a cool down table 38. Timer 36 tracks lamp 20 and cooling fan 28 operating time. Upon transition of lamp 20 from an on state to an off state, cooling manager 32 determines the lamp operating time from timer 36 and looks up a cool down time to run cooling fan 28 from a cool down table 38. Cooling manager 32 runs cooling fan 28 for the cool down time associated with the detected lamp operating time and then shuts down cooling fan 28. Cooling manager 32 runs on firmware in projector 12 and has timer 36 periodically read and stored timed values for use in the event of a power loss, such as disconnection from external power 26.

The variably defined time is determined to minimize projector cooling fan 28 cool down running time while meeting projector operating goals. The amount of cool down time increases as lamp operating time increases and is determinable by experimentation of projector operating times compared with adequate cool down times for the operating times. A typical projector takes as long as fifty minutes to heat to a fully operational temperature, so lamp operating times of less than fifty minutes generally result in proportionally less operational temperatures and, thus, need proportionally less cool down times. However, lamp life is affected by the cooling gradient, or rate of cooling, used to cool the lamp. Rapid or high cooling gradients tend to reduce lamp life as internal metal parts contract. Thus, cooling manager 32 allows selection of convenience or long-life cool down modes. The convenience mode provides a high cooling gradient, such as cooling fan 28 operating at maximum speed, for the quickest cool down time and more rapid cooling fan shut down. The long-life mode provides a reduced cooling gradient, such as cooling fan 28 operating at a reduced speed, for a longer cool down time that places reduced thermal stress on lamp 20 for longer lamp life. Based on a user selection, cooling manager 32 looks up convenience or long-life cool down times from cool down table 38 and runs cooling fan 28 at the selected of a convenience or long-life speed for the time provided by cool down table 38. Alternatively, cooling manager 32 tracks the temperature provided by thermocouple 34 and uses the measured temperature to vary the speed of cooling fan 28 to achieve a desired cool down rate.

Figure 2:
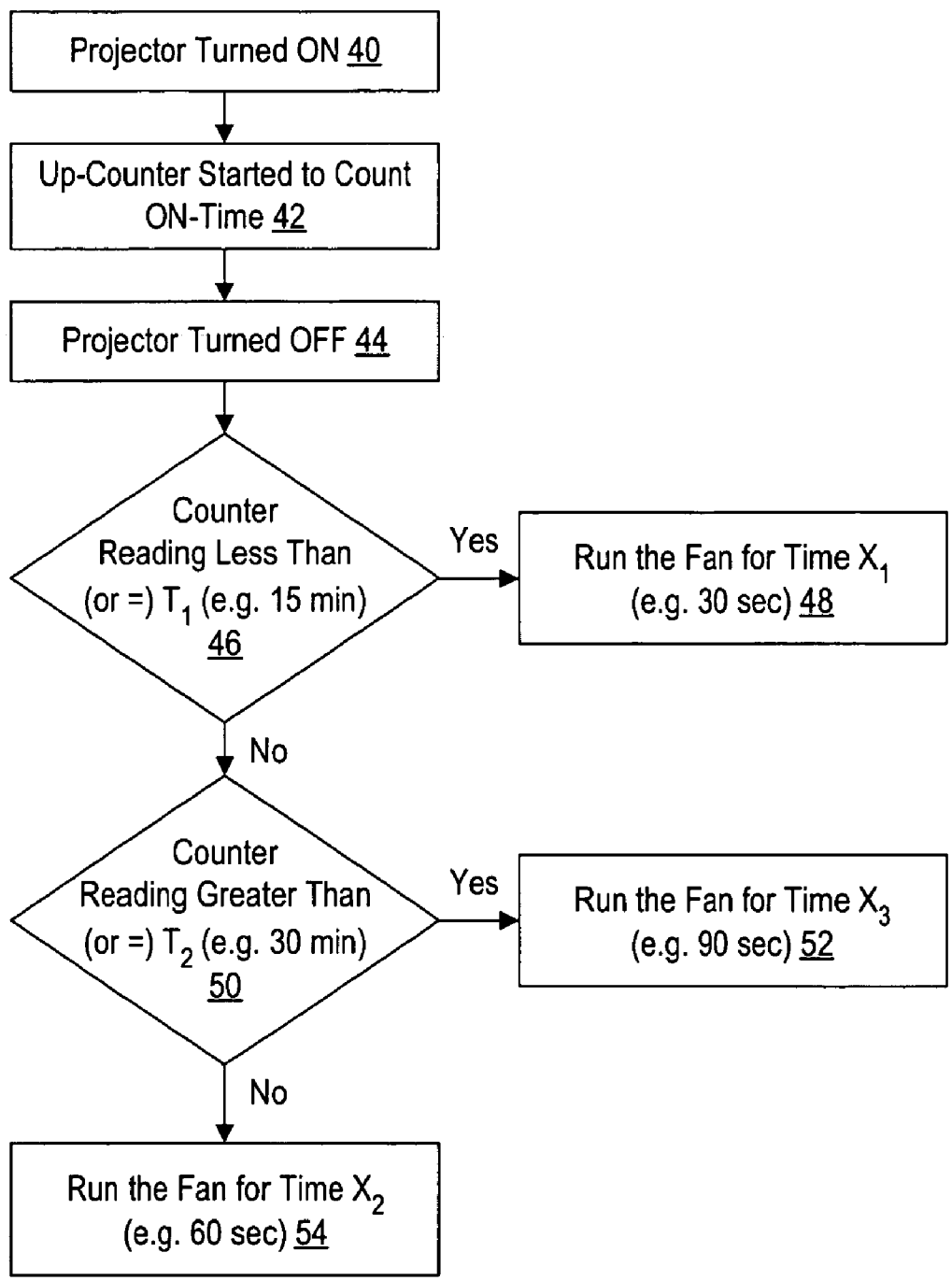
FIG. 2 depicts a flow diagram of a process for cool down periods variably defined based upon lamp operating times.

Referring now to FIG. 2, a flow diagram depicts a process for cool down periods variably defined based upon lamp operating times. The process begins at step 40 when the projector turns on and continues at step 42 with an up-counter started to count projector operating time until, at step 44 the projector is turned off. At step 46 a determination is made of whether the counter reading is less than or equal to a first time period, such as 15 minutes, and, if yes, at step 48 the cooling fan is run for a first cool down time, such as 30 seconds. If the determination at step 46 is no, the process continues to step 50 for a determination of whether the counter reading is greater than or equal to a second time period, such as 30 minutes. If the determination at step 50 is yes, the process continues to step 52 for the cooling fan to run for a second cool down time, such as 90 seconds. If the determination at step 50 is no, the process continues to step 54 for the cooling fan to run for a third cooling down time, such as 60 seconds. In various embodiments, the projector operating time and associated fan operating time may vary depending on the rate at which the projector heats and cools.

Figure 3:
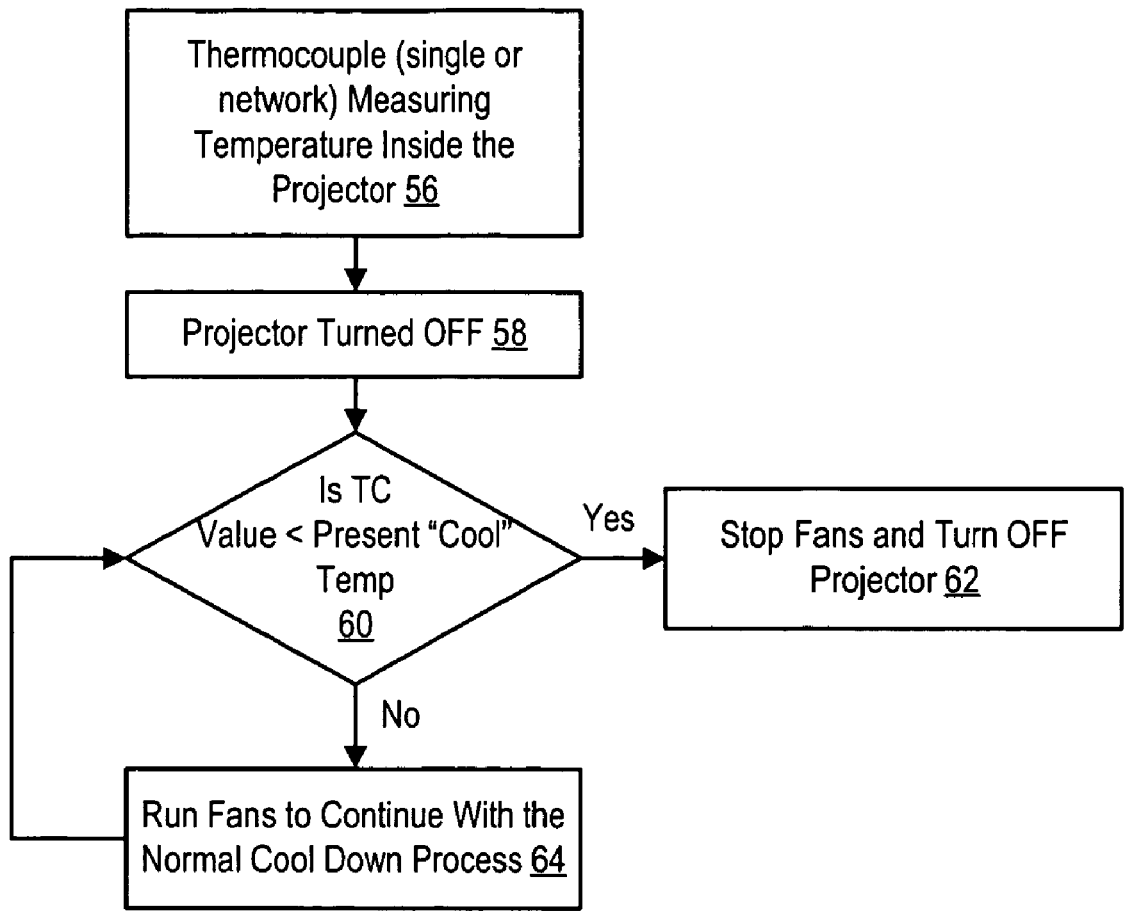
FIG. 3 depicts a flow diagram of a process for cool down periods variably defined based upon measured projector temperature.

Referring now to FIG. 3, a flow diagram depicts a process for cool down periods variably defined based upon measured projector temperature. The process begins at step 56 with a thermocouple or network of thermocouples measuring the temperature within the projector. At step 58, the projector is powered off and, at step 60 a determination is made of whether the thermocouple-measured temperature is less than a predetermined cool down temperature. If not, the process continues to step 64 to run the cooling fan and periodically returns to step 60 to recheck the temperature. Once the temperature is less than the predetermined cool down temperature, the process continues to step 62 at which the cooling fan and projector are turned off.

Figure 4:
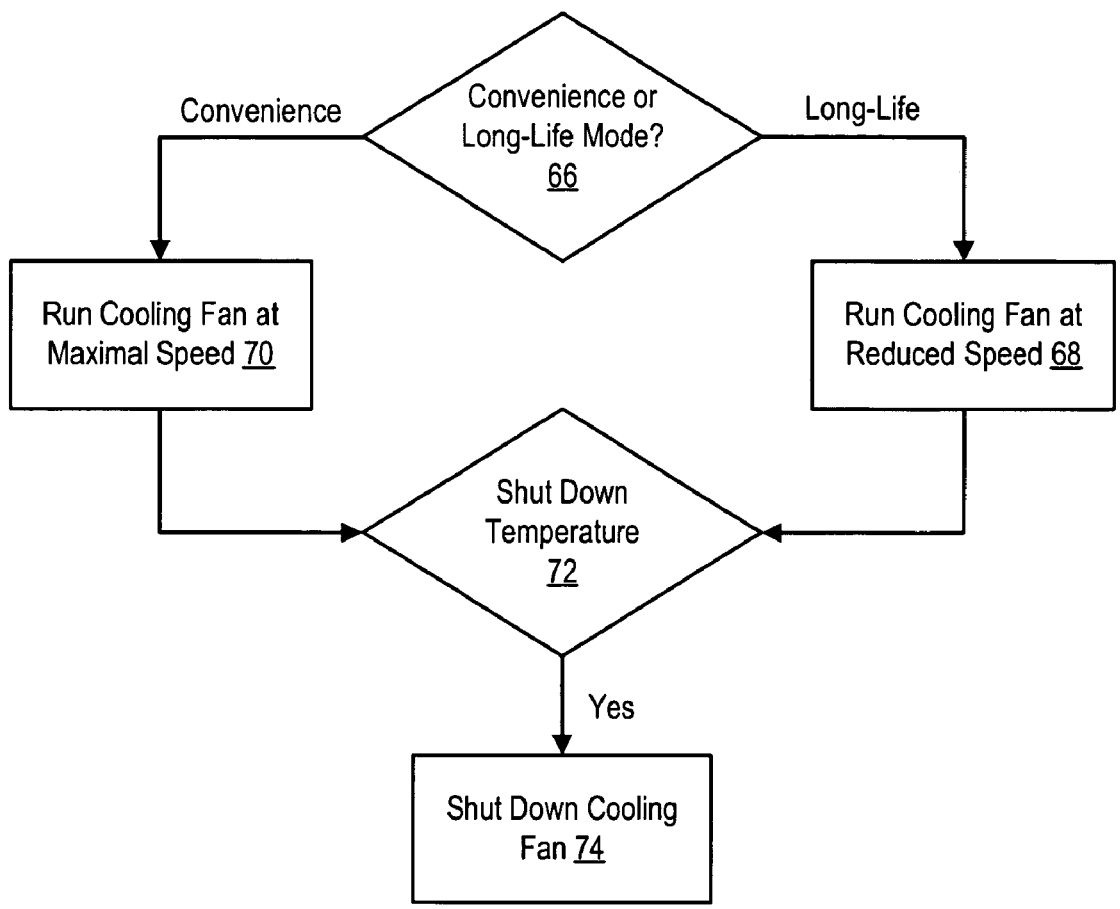
FIG. 4 depicts a flow diagram of a process for selecting a convenience or a long-life cool down gradient.

Referring now to FIG. 4, a flow diagram depicts a process for selecting a convenience or a long-life cool down gradient. At step 66 a determination is made of whether a convenience or long-life cool down mode is selected. If a long-life cool down mode is selected the process continues to step 68 to run the cooling fan at a reduced speed associated with a cooling gradient that places reduced thermal stress on the projector lamp, such as with a temperature change over time within predetermined limitations. The reduced cooling fan speed and slower cool down rate results in increased cool down time for the projector and longer usable life for the lamp. If at step 66 the convenience cool down mode is selected, the process continues to step 70 to run the cooling fan at a maximal speed to achieve a rapid projector cool down for greater user convenience. The maximal speed is at the maximum effective fan speed, which may or may not be the maximum speed of the fan, in order to remove heat from the projector in a rapid manner. Once the cool down is complete at both steps 68 and 70, the process continues to step 72 to detect the shut down temperature and to step 74 to shut down the cooling fan.

Although the present invention has been described in detail, it should be understood that various changes, substitutions and alterations can be made hereto without departing from the spirit and scope of the invention as defined by the appended claims.

What is claimed is:

1. An information handling system projector comprising:
   a housing;
   image processing components disposed in the housing and operable to accept information from an information handling system to generate a display of an image associated with the information;
   a lamp disposed in the housing, the lamp having an on state operable to illuminate the display of the image and an off state;
   a lens aligned with the image processing components and lamp to present the display of the image at a distal point;
   a cooling fan disposed in the housing and operable to provide cooling airflow that removes heat from the housing; and
   a cooling manager interfaced with the lamp and the fan, the cooling manager operable to run the cooling fan for a variably defined time period after the lamp changes from the on state to the off state, the cooling manager having a timer operable to track the time the lamp is operating in the on state and to track the time the cooling fan runs and having a cool down table with plural operating times, each lamp operating time representing time the lamp is in an on state and with plural variably defined times, each lamp operating time associated with a variably defined time;
   wherein the cooling manager determines the variably defined time to run the cooling fan after the lamp changes to the off state by reference to the timer to determine the time the lamp was operating in the on state and by reference to the cool down table for the variably defined time associated with the lamp operating time determined by the timer.

2. The information handling system projector of claim 1 wherein the cooling manager is further operable to select a convenience cool down mode having a minimal variably defined time by running the cooling fan at a maximal cooling gradient.

3. The information handling system projector of claim 1 wherein the cooling manager is further operable to select a long-life cool down mode by running the cooling fan at a reduced cooling gradient.

4. The information handling system projector of claim 1 wherein the cool down table further comprises first and second sets of variably defined times, the first set associated with a convenience cool down mode having a minimal variably defined time associated with a maximal cooling gradient, the second set associated with a long-life cool down mode having a greater variably defined time associated with a reduced cooling gradient.

5. The information handling system of claim 1 wherein the timer is further operable to periodically refresh to track lamp and fan operating times in the event of power failure.

6. A method for cool down of an information handling system projector, the method comprising:
   detecting a change in state of a lamp of the projector from an on state to an off state;
   running a cooling fan of the projector for a variably defined time after detection of the lamp off state;
   shutting down the cooling fan at expiration of the variably defined time;
   determining the lamp operating time at detection of the lamp off state; and
   determining the variably defined time by looking up the lamp operating time from a table of plural lamp operating times, each of the plural lamp operating times having an associated variably defined time, and by selecting the variably defined time associated with the determined lamp operating time.

7. The method of claim 6 further comprising:

selecting a convenience cool down mode;

determining the variably defined time from a convenience cool down mode table; and running the cooling fan to have a maximal cooling gradient for the variably defined time.

8. The method of claim 6 further comprising:

selecting a long-life cool down mode;

determining the variably defined time from a long-life cool down mode table; and running the cooling fan to have a reduced cooling gradient for the variably defined time.

9. A system for managing cool down of a projector, the projector having a lamp that turns on to illuminate an image and a cooling fan, the system comprising:

a cooling manager operable to detect if the lamp is on;

a timer associated with the cooling manager and operable to determine a lamp operating time for the time period that the lamp is on; and a cool down table associated with the cooling manager and having plural lamp operating times, each lamp operating time associated with a cool down time;

wherein the cooling manager is further operable to detect transition of the lamp from on to off, to obtain the lamp operating time from the timer, to look up the cool down time associated with the lamp operating time from the cool down table and to run the cooling fan for the cool down time.

10. The system of claim 9 wherein the cool down table further comprises a convenience mode cool down time and a long-life cool down time associated with each lamp operating time, the cooling manager further operable to run the cooling fan for a selected of the convenience mode cool down time or the long-life cool down time.

11. The system of claim 10 wherein the convenience mode cool down time is associated with running the fan at an increased cooling gradient and the long-life cool down time is associated with running the fan at a decreased cooling gradient.

* * * * *